US012639059B2

(12) United States Patent
Huang et al.

(10) Patent No.: US 12,639,059 B2
(45) Date of Patent: May 26, 2026

(54) AUTOMATIC FIRMWARE UPDATING

(71) Applicant: QUANTA COMPUTER INC.,
Taoyuan City (TW)

(72) Inventors: Yu-Chu Huang, Taoyuan City (TW);
Ko-Chin Chung, Taoyuan City (TW)

(73) Assignee: Quanta Computer Inc., Taoyuan City
(TW)

( * ) Notice: Subject to any disclaimer, the term of this
patent is extended or adjusted under 35
U.S.C. 154(b) by 222 days.

(21) Appl. No.: 18/402,045

(22) Filed: Jan. 2, 2024

(65) Prior Publication Data

US 2025/0217129 A1 Jul. 3, 2025

(51) Int. Cl.
*G06F 8/65* (2018.01)
*G06F 8/654* (2018.01)

(52) U.S. Cl.
CPC ............... *G06F 8/65* (2013.01); *G06F 8/654*
(2018.02)

(58) Field of Classification Search
CPC ................................... G06F 8/60–66
USPC ................................. 717/168–178
See application file for complete search history.

(56) References Cited

U.S. PATENT DOCUMENTS

| | | | | | |
|---|---|---|---|---|---|
| 9,177,122 | B1 * | 11/2015 | Trier | ......................... | G06F 8/65 |
| 2005/0229173 | A1 * | 10/2005 | Mihm | ....................... | G06F 8/65 |
| | | | | | 717/171 |
| 2013/0173952 | A1 * | 7/2013 | Gao | ....................... | G06F 9/4406 |
| | | | | | 714/E11.112 |
| 2014/0109076 | A1 * | 4/2014 | Boone | ................... | H04L 63/105 |
| | | | | | 717/170 |
| 2020/0218612 | A1 * | 7/2020 | Ganesan | ............. | G06F 11/1417 |
| 2021/0182398 | A1 * | 6/2021 | Schack | ..................... | G06F 8/65 |

FOREIGN PATENT DOCUMENTS

TW 1839136 B * 4/2024

OTHER PUBLICATIONS

Intelligent Platform Management Interface, Wikipedia, 2022, 7
pages, [retrieved on Oct. 7, 2025], Retrieved from the Internet:
<URL: https://web.archive.org/web/20221229214946/https://en.
wikipedia.org/wiki/Intelligent_Platform_Management_Inter-
face>.*

* cited by examiner

*Primary Examiner* — Geoffrey R St Leger
(74) *Attorney, Agent, or Firm* — NIXON PEABODY LLP

(57) ABSTRACT

Systems and methods are disclosed for automating firmware
updating on a computing system. Specifically, the aspects
and features disclosed allow a baseboard management con-
troller (BMC) to automatically step through the local firm-
ware versions of various components of a computing system
and compare those versions with up-to-date firmware ver-
sions to see whether any of the local firmware versions
should be replaced with the respective up-to-date firmware
version. The up-to-date firmware versions can be obtained
from vendor firmware server(s) either locally by the com-
puting system (e.g., by a BMC or main processor of the
computing system) or remotely. When up-to-date firmware
versions are obtained remotely, a facilitator system can
obtain the up-to-date firmware versions and save them to a
removable storage device, which can be temporarily coupled
to the BMC of the computing system to automatically
update the firmware of the components of that computing
system.

17 Claims, 5 Drawing Sheets

100

200

AUTOMATIC FIRMWARE UPDATING

The present disclosure relates to computing devices generally and more specifically to automatic firmware updating of components of computing devices.

BACKGROUND

Computing devices are often manufactured with many individual components, each of which requires firmware to properly operate. For example, a server may include various components, such as a network card, a power supply, a storage device, a complex programmable logic device (CPLD), and the like. Each of these components may have firmware within that enables the component to function as desired and communicate with other elements of the computing system. Generally, components will have firmware installed upon manufacturing of the individual component.

However, updates to different pieces of firmware may occur periodically, rendering the pre-loaded firmware no longer up-to-date. Generally, different components of the computing device will have different tools that are used to update the firmware. Each of these different tools may also require different operating procedures. Traditionally, computing devices are updated by sequentially executing these different tools one by one to ensure each component is updated with the most up-to-date firmware version. Thus, the process to update firmware for these computing devices is often difficult to automate and requires substantial manual effort and time. Often, the process of updating component firmware includes booting a computing system into an operating system, and for each component sequentially: downloading a firmware updating tool, downloading the up-to-date firmware version, and executing the firmware updating tool to update the firmware of the component. As a result, the process of updating component firmware can be a slow and burdensome activity.

There is a need to fix these and other issues with updating component firmware.

BRIEF SUMMARY

The term embodiment and like terms are intended to refer broadly to all of the subject matter of this disclosure and the claims below. Statements containing these terms should be understood not to limit the subject matter described herein or to limit the meaning or scope of the claims below. Embodiments of the present disclosure covered herein are defined by the claims below, supplemented by this summary. This summary is a high-level overview of various aspects of the disclosure and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this disclosure, any or all drawings and each claim.

Embodiments of the present disclosure include a method including receiving, by a baseboard management controller (BMC) of a computing system, an indication to commence a firmware update process. The method further includes identifying, by the BMC, a set of components. The set of components includes one or more components of the computing system. The method further includes accessing, by the BMC, for each component of the set of components, a local firmware version associated with the respective component, the local firmware version being usable to operate the respective component for use in the computing system. The method further includes accessing, by the BMC, a firmware collection from a storage device coupled to the BMC. The firmware collection includes at least one up-to-date firmware version for a plurality of components. The method further includes comparing, by the BMC, for each component of the set of components, the local firmware version with the at least one up-to-date firmware version. The method further includes detecting, by the BMC, for one or more components of the set of components, a firmware version discrepancy based on the comparing of a respective local firmware version with a respective up-to-date firmware version. The method further includes updating, by the BMC, in response to detecting the firmware version discrepancy, the respective local firmware version with the respective up-to-date firmware version.

The method may also include where the set of components includes at least a first component from a first manufacturer and a second component from a second manufacturer. The method may also include where receiving the indication to commence the firmware update process, identifying the set of components, accessing the local firmware version, accessing the firmware collection, comparing the local firmware version with the at least one up-to-date firmware version, detecting the firmware version discrepancy, and updating the local firmware version all occur prior to a processor of the computing system loading an operating system. The method may also include where the storage device is a removable storage device communicatively coupled to the BMC. The method may also include where receiving the indication to commence the firmware update includes receiving a signal from a remote system. The method may also include further includes accessing one or more vendor firmware servers associated with the plurality of components, and storing the up-to-date firmware versions for the plurality of components on the storage device. The method may also include where detecting the firmware version discrepancy includes detecting that the up-to-date firmware version (i) has at a higher version number than the local firmware version; (ii) is more recent than the local firmware version; or (iii) both (i) and (ii). Other technical features may be readily apparent to one skilled in the art from the following figures, descriptions, and claims.

Embodiments of the present disclosure include a computer system comprising a processor coupled to processor-accessible memory containing instructions thereon to load an operating system. The computer system further comprises a set of components. Each of the set of components has an associated local firmware version that is usable to operate the respective component for use in the computing system. The computer system further comprises a baseboard management controller (BMC). The computer system further comprises a storage device communicatively couplable to the BMC. The computer system further comprises a non-transitory storage medium communicatively coupled to the BMC and containing instructions which, when executed by the BMC, cause the BMC to perform operations including receiving an indication to commence a firmware update process. The operations further include identifying the set of components. The operations further include accessing, for each of the set of components, the local firmware version associated with the respective component. The operations further include accessing a firmware collection from the storage device. The firmware collection includes, for a plurality of components, at least one up-to-date firmware version. The operations further include comparing, for each of the set of components, the local firmware version with the at least one up-to-date firmware version of the firmware collection. The operations further include detecting, for one or more of the set of components, a firmware version discrepancy based on the comparison of the respective local firmware version with respective up-to-date firmware version. The operations further include updating, in response to detecting the firmware version discrepancy, the respective local firmware version with the respective up-to-date firmware version from the storage device.

The computing system may also include where the set of components includes at least a first component from a first manufacturer and a second component from a second manufacturer, and where detecting the firmware version discrepancy includes detecting that the up-to-date firmware version (i) has at a higher version number than the local firmware version; (ii) is more recent than the local firmware version; or (iii) both (i) and (ii). The computing system may also include where receiving the indication to commence the firmware update process, identifying the set of components, accessing the local firmware version, accessing the firmware collection, comparing the local firmware version with the at least one up-to-date firmware version, detecting the firmware version discrepancy, and updating the respective local firmware version all occur prior to the processor loading the operating system. The computing system may also include where the storage device is a removable storage device communicatively coupled to the BMC, and where receiving the indication to commence the firmware update includes detecting insertion of the removable storage device. Other technical features may be readily apparent to one skilled in the art from the following figures, descriptions, and claims.

Embodiments of the present disclosure include a computing environment comprising a removable storage device. The computing environment further comprises a facilitator system communicatively couplable to at least one vender firmware server to access up-to-date firmware versions for a plurality of components from the at least one vendor firmware server. The facilitator system includes a facilitator processor. The facilitator system further includes a facilitator non-transitory storage medium communicatively coupled to the facilitator processor and containing instructions which, when executed by the facilitator processor, cause the facilitator processor to perform facilitator operations including accessing the one or more vendor firmware servers. The facilitator operations further include storing the up-to-date firmware versions for the plurality of components on the removable storage device as a firmware collection. The computing environment further comprises a computer system distinct from the facilitator system. The computer system includes a processor coupled to processor-accessible memory containing instructions thereon to load an operating system. The computer system further includes a set of components. Each of the set of components has an associated local firmware version that is usable to operate the respective component for use in the computing system. The computer system further includes a baseboard management controller (BMC). The computer system further includes a non-transitory storage medium communicatively coupled to the BMC and containing instructions which, when executed by the BMC, cause the BMC to perform operations including receiving an indication to commence a firmware update process. The operations further include identifying the set of components. The operations further include accessing, for each of the set of components, the local firmware version associated with the respective component. The operations further include accessing the firmware collection from the removable storage device. The firmware collection including at least one up-to-date firmware version associated with each of the set of components. The operations further include comparing, for each of the set of components, the local firmware version with the at least one up-to-date firmware version of the firmware collection. The operations further include detecting, for one or more of the set of components, a firmware version discrepancy based on the comparison of the respective local firmware version with respective up-to-date firmware version. The operations further include updating, in response to detecting the firmware version discrepancy, the respective local firmware version with the respective up-to-date firmware version from the removable storage device.

The computing environment may also include where the set of components includes at least a first component from a first manufacturer and a second component from a second manufacturer, and where detecting the firmware version discrepancy includes detecting that the up-to-date firmware version (i) has at a higher version number than the local firmware version; (ii) is more recent than the local firmware version; or (iii) both (i) and (ii). The computing environment may also include where receiving the indication to commence the firmware update process, identifying the set of components, accessing the local firmware version, accessing the firmware collection, comparing the local firmware version with the at least one up-to-date firmware version, detecting the firmware version discrepancy, and updating the respective local firmware version all occur prior to the processor loading the operating system. The computing environment may also include where receiving the indication to commence the firmware update includes detecting insertion of the removable storage device. Other technical features may be readily apparent to one skilled in the art from the following figures, descriptions, and claims.

Additional features and advantages of the disclosure will be set forth in the description that follows, and will in part, be obvious from the description; or can be learned by the practice of the principles set forth herein. The features and advantages of the disclosure can be realized and obtained by means of the instruments and combinations particularly pointed out in the appended claims. These and other features of the disclosure will become fully apparent from the following description and appended claims, or can be learned by the practice of the principles set forth herein.

BRIEF DESCRIPTION OF THE SEVERAL VIEWS OF THE DRAWINGS

The specification makes reference to the following appended figures, in which use of like reference numerals in different figures is intended to illustrate like or analogous components.

Figure 1:
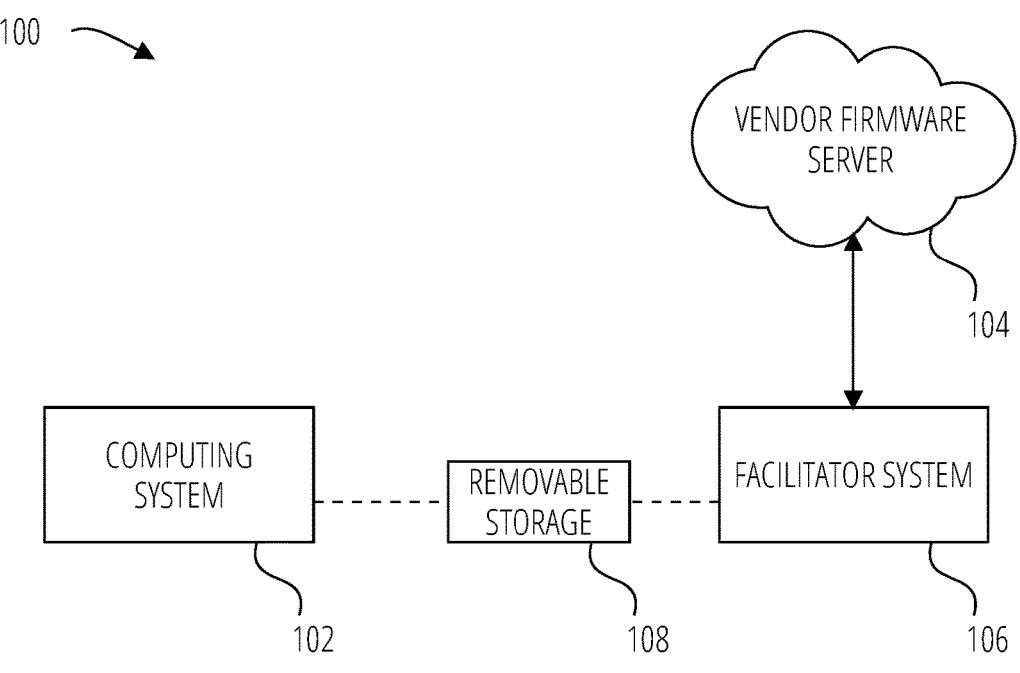
FIG. 1 is a block diagram depicting a computing environment for automating firmware updates using removable storage, according to certain aspects of the present disclosure.

The present disclosure is susceptible to various modifications and alternative forms. Some representative embodiments have been shown by way of example in the drawings and will be described in detail herein. It should be understood, however, that the invention is not intended to be limited to the particular forms disclosed. Rather, the disclosure is to cover all modifications, equivalents, and alternatives falling within the spirit and scope of the invention as defined by the appended claims.

DETAILED DESCRIPTION

Certain aspects and features of the present disclosure relate to systems and methods for automating firmware updating on a computing system. Specifically, the aspects and features disclosed allow a baseboard management controller (BMC) to automatically step through the local firmware versions of various components of a computing system and compare those versions with up-to-date firmware versions to see whether any of the local firmware versions should be replaced with the respective up-to-date firmware version. The up-to-date firmware versions can be obtained from vendor firmware server(s) either locally by the computing system (e.g., by a BMC or main processor of the computing system) or remotely. When up-to-date firmware versions are obtained remotely, a facilitator system can obtain the up-to-date firmware versions and save them to a removable storage device, which can be temporarily coupled to the BMC of the computing system to automatically update the firmware of the components of that computing system.

An indication to commence a firmware update can be received by a BMC of a computing system. Examples of such an indication can be physical signals received from user input (e.g., a user pressing a button), attachment of a removable storage device (e.g., insertion of a universal serial bus (USB) drive into an appropriate receptacle), a remote signal received via a network (e.g., a user initiating the update by sending a command to the BMC via a network interface), a timed signal (e.g., a timed signal received at predetermined intervals or a timed signal received at a predetermined time), or the like. In an especially useful example, a BMC can automatically receive the indication in response to attachment of a removable storage device to the computing system.

According to certain aspects and features of the present disclosure, upon receiving the indication to commence, the BMC can start accessing the local firmware versions of connected components. The BMC can access up-to-date firmware versions stored on a storage device (e.g., a removable storage device) and compare the local firmware version with the up-to-date firmware version to determine if there is a discrepancy. If a discrepancy is identified, the local firmware version can be replaced by the up-to-date firmware version. In some cases, the discrepancy can be that the up-to-date firmware version has a higher version number or has a more recent date. In some cases, the discrepancy can merely be that the local firmware version is not the same as the up-to-date firmware version. As used herein, the term "local firmware version" is intended to describe the underlying piece of firmware (e.g., binary code) currently installed on the computing system (e.g., stored in memory of a component) itself rather than solely the version indicator (e.g., version number) of that piece of firmware. Likewise, the term "up-to-date firmware version" is intended to describe the underlying piece of firmware (e.g., binary code) that is not yet installed on the computing system, but available to be compared to the local firmware version (e.g., stored on a storage device or stored on a vendor firmware server), itself rather than solely the version indicator (e.g., version number) of that piece of firmware.

Further, as used herein, the term "up-to-date" with respect to a firmware version is intended to indicate a version of the firmware that is currently desired for a use case. In some cases, this firmware can be the most recently released (stable) version of the firmware. In some cases, however, this firmware can be a particular version of the firmware that may not necessarily be the most recently released (stable) version. For example, in some cases a manufacturer or customer may desire to use a particular version of firmware instead of a most recent version to ensure compatibility with other aspects of the computing system or for other reasons.

Certain aspects and features of the present disclosure are especially useful in the final steps of preparing computer systems, such as servers, to leave a manufacturer. These computer systems can include many components, such as network cards, power supplies, storage devices, CPLDs, and the like. Components can refer to hardware components (e.g., a power supply) or software components (e.g., a BIOS (basic input/output system)). Each of these components can have associated firmware. In some cases, the firmware is stored on memory within the component itself, although that need not always be the case. In some cases the firmware is stored on other memory, such as a memory accessible to a main processor of the computing system. During initial assembly of the computing system, the firmware associated with each component can be a particular version of firmware that was available at a particular time (e.g., available when the component was manufactured, available when the component was installed, etc.). However, by the time the computing system is ready to leave the factory, the new firmware versions for one or more of the component may be available. Thus, certain aspects and features of the present disclosure can allow for the easy and automated updating of firmware on these computing systems, such as by simply inserting a USB drive and waiting for the automated update process to complete.

In some cases, it can be desired to load a specific firmware version, which may or may not be the most recent version, onto a computing system, such as based on customer requirements. For example, a manufacturer may make ten computing systems with the same hardware specifications, but for customer A, may use firmware version A for the power supply and BIOS, and for customer B, may use firmware version B for the power supply and BIOS. Thus, customer A and customer B may receive computer systems with the same hardware specifications, but that operate in different ways. In such cases, a comparison used to compare a local firmware version with an up-to-date firmware version can simply compare whether or not the local firmware version is the up-to-date firmware version, and if not, replace the local firmware version with the up-to-date firmware version.

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative embodiments but, like the illustrative embodiments, should not be used to limit the present disclosure. The elements included in the illustrations herein may not be drawn to scale.

FIG. 1 is a block diagram depicting a computing environment 100 for automating firmware updates using removable storage 108, according to certain aspects of the present disclosure. The computing system 102 is any suitable computing system for which updating of component firmware is desired. The computing system 102 can be any suitable computing system, such as a personal computer, a laptop, a smartphone, a server, or the like. The computing system 102 can include a set of components, which can be at least one component, but is generally two or more components.

Computing environment 100 includes a facilitator system 106. The facilitator system 106 can be any suitable computing system, such as a server. The facilitator system 106 is a distinct system from the computing system 102. The facilitator system 106 can be located in a separate housing from computing system 102, and in fact can be located in entirely separate locations (e.g., separate rooms, floors, buildings, cities, states, countries, etc.).

The facilitator system 106 can access firmware from one or more vendor firmware servers 104. The facilitator system 106 can download a set list of firmware from the one or more vendor firmware servers 104, such as the latest firmware for each of a preset list of components (e.g., a list of the components expected to be seen in the computing system 102, such as those components with which the manufacturer regularly works, or a list of components known to be present in the computing system 102). In some cases, facilitator system 106 can access specific versions of firmware from the one or more vendor firmware servers 104, such as the most recent version that is compatible with certain limitations (e.g., compatible with a particular motherboard or processor).

The facilitator system 106 can store the up-to-date firmware versions it accesses from the vendor firmware server 104 in removable storage 108. These up-to-date firmware versions stored on the removable storage 108 can be referred to as a firmware collection.

The removable storage 108 can be any suitable storage device that can be removably, communicatively coupled to the computing system 102 and the facilitator system 106. The removable storage 108 may be couplable to only one of the computing system 102 and facilitator system 106 at a time. Examples of suitable removable storage 108 include USB drives, embedded multimedia card (eMMC) devices, secure digital (SD) cards, or any other suitable removable storage device.

In an example use case, the removable storage 108 can be inserted into facilitator system 106. The facilitator system 106 can, automatically upon attachment of the removable storage 108 or manually upon user input, access the desired up-to-date firmware versions from the one or more vendor firmware servers 104. The facilitator system 106 can then store those up-to-date firmware versions on the removable storage 108. Then, the removable storage 108 can be attached to the computing system 102. The computing system 102 can then, automatically upon attachment of the removable storage 108 or manually upon user input, compare local firmware versions of its own components with those on the removable storage 108. For any discrepancies identified, the computing system 102 can replace the local firmware version with the up-to-date firmware version from the removable storage 108. These actions on the computing system 102 can be accomplished by the BMC. The BMC can make use of any vendor-specific firmware tools already available to the BMC to replace the local firmware version with the up-to-date firmware version from the removable storage 108.

Figure 2:
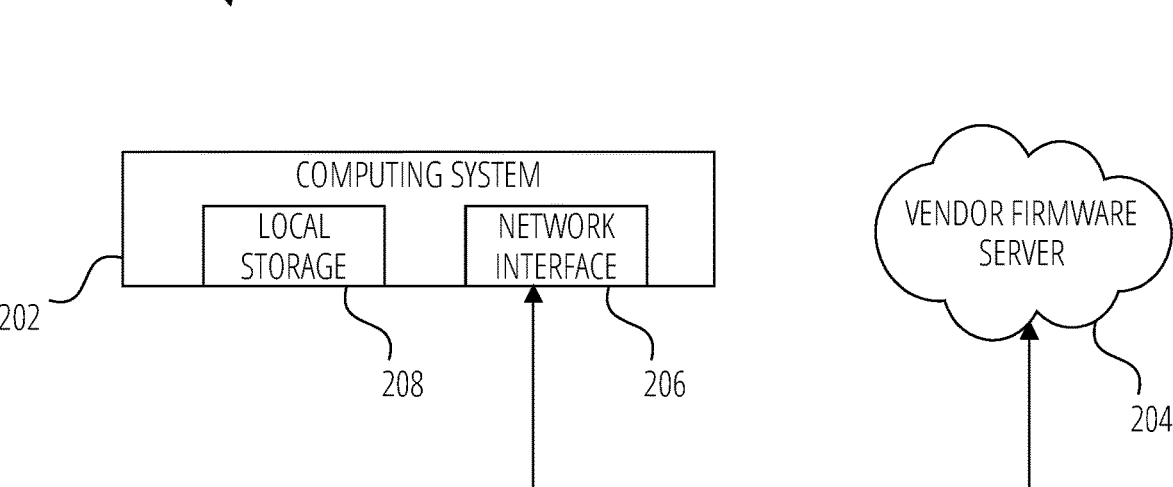
FIG. 2 is a block diagram depicting a computing environment for automating firmware updates using local storage, according to certain aspects of the present disclosure.

FIG. 2 is a block diagram depicting a computing environment 200 for automating firmware updates using local storage 208, according to certain aspects of the present disclosure. The computing system 202 is any suitable computing system for which updating of component firmware is desired. The computing system 202 can be any suitable computing system, such as a personal computer, a laptop, a smartphone, a server, or the like. The computing system 202 can include a set of components, which can be at least one component, but is generally two or more components.

Computing environment 200 includes one or more vendor firmware servers 204. These one or more vendor firmware servers 204 can host firmware for one or more components that may be used in the computing system 202. For example, a vendor firmware server 204 can host the latest firmware for a particular component.

Computing system 202 can be communicatively coupled to the one or more vendor firmware servers 204 to download firmware from the one or more vendor firmware servers 204. The computing system 202 can communicatively couple to the one or more vendor firmware servers 204 via a network connection via a network interface 206 of the computing system 202. In some cases, accessing firmware can occur in an operating system environment after booting into an operating system. For example, a program can be executed in an operating system to access and store firmware from one or more vendor firmware servers 204 onto local storage 208. In some cases, however, accessing firmware can occur outside of an operating system environment prior to booting into an operating system. In such cases, the BMC of the computing system 202 can initialize and make use of the network interface 206 to access the firmware, which the BMC can then store in local storage 208.

The computing system 202 can access a set list of firmware from the one or more vendor firmware servers 204, such as the latest firmware for each of a preset list of components (e.g., a list of the components expected to be seen in the computing system 202, such as those components with which the manufacturer regularly works, or a list of components known to be present in the computing system 202). In some cases, computing system 202 can access specific versions of firmware from the one or more vendor firmware servers 204, such as the most recent version that is compatible with certain limitations (e.g., compatible with a particular motherboard or processor).

The facilitator computing system 202 can store the up-to-date firmware versions it accesses from the vendor firmware server 204 in local storage 208. These up-to-date firmware versions stored on the local storage 208 can be referred to as a firmware collection. The local storage 208 can be any suitable storage that is accessible by the BMC. The local storage 208 can be a non-volatile memory.

In an example use case, upon receiving an indication (e.g., automatic or manual) to prepare for a firmware update, the computing system 202 can access the desired up-to-date firmware versions from the one or more vendor firmware servers 204 and then store those up-to-date firmware versions on the local storage 208.

Immediately thereafter or some time later, the computing system 202 can commence updating the component firmware. This updating can occur upon receiving an indication to commence the firmware update (e.g., detection of the firmware collection in the local storage 208, receiving user input, etc.). The BMC can then compare local firmware versions of the components of the computing system 202 with those on the local storage 208. For any discrepancies identified, the computing system 202 can replace the local firmware version with the up-to-date firmware version from the local storage 208. These actions on the computing system 202 can be accomplished by the BMC. The BMC can make use of any vendor-specific firmware tools already available to the BMC to replace the local firmware version with the up-to-date firmware version from the removable local storage 208.

Figure 3:
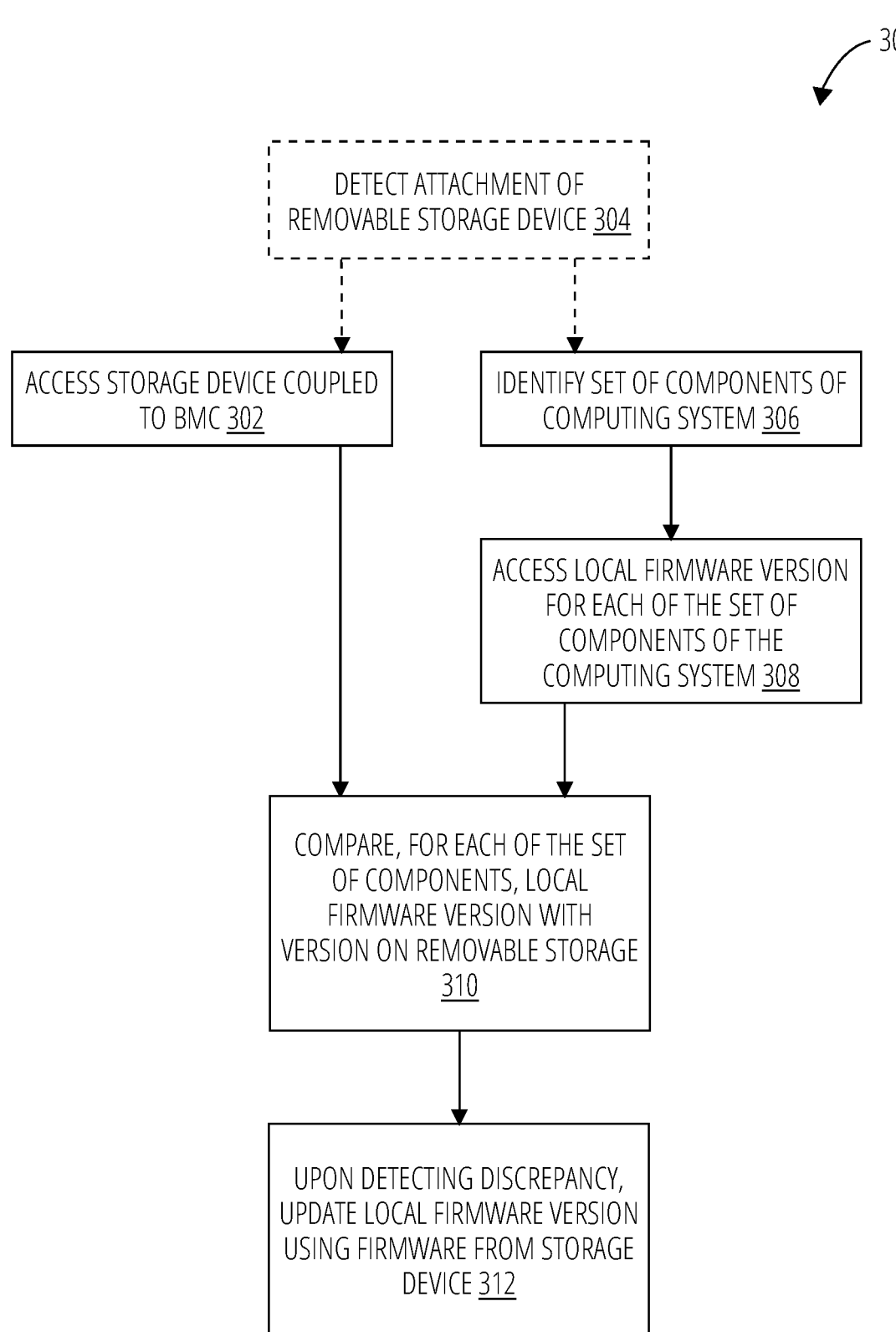
FIG. 3 is a flowchart depicting a process for automating firmware updates, according to certain aspects of the present disclosure.

FIG. 3 is a flowchart depicting a process 300 for automating firmware updates, according to certain aspects of the present disclosure. Process 300 can be performed by a BMC of a computing system, such as computing system 102 or computing system 202 of FIG. 1 or 2, respectively.

In some optional cases, process 300 can include detecting attachment (e.g., insertion) of a removable storage device at block 304. For example, detecting the attachment of the removable storage device can include detecting that a USB drive has been inserted into a USB port communicatively coupled to the BMC. This detection at block 304 can start other blocks of process 300, such as blocks 302, 306.

At block 302, the storage device coupled to the BMC can be accessed. In some cases, such as those seen in FIG. 1, the BMC can access a removable storage device. In some cases, such as those seen in FIG. 2, the BMC can access a local storage device. Accessing the storage device at block 302 can include accessing the firmware collection contained therein, which can include one or more up-to-date firmware versions for one or more components.

At block 306, the set of components of the computing system can be identified. In some cases, identifying the set of components at block 306 can include automatically detecting those components that both are accessible to the BMC and have updatable firmware (e.g., firmware stored on a memory other than read-only memory). In some cases, the set of components includes one, some, or all components of the computing system. In some cases, identifying the set of components at block 306 can include accessing a prepopulated list of the set of components.

At block 308, the BMC can access local firmware versions for each of the set of components from block 306. Accessing the local firmware version can include reading memory on which the firmware is stored. In some cases, accessing the local firmware version can include accessing memory of the component to read the local firmware version itself of a version indicator associated with the local firmware version.

At block 310, the BMC can compare, for each of the set of components from block 306, the local firmware version from block 308 and the up-to-date firmware version from block 302 that is associated with that given component. Comparing the local firmware version with the up-to-date firmware version can include comparing some or all of the files themselves, comparing version indicators associated with the firmware, or comparing other metadata (e.g., a version date) stored in association with the firmware. A discrepancy can be identified when the local firmware version (or a version indicator associated therewith or other metadata associated therewith) does not match the up-to-date firmware version (or a version indicator associated therewith or other metadata associated therewith).

At block 312, upon detecting the discrepancy, the BMC can automatically update the local firmware version using the up-to-date firmware version from the storage device. In some cases, updating the local firmware version includes replacing the local firmware version with the up-to-date firmware version, such as by writing the up-to-date firmware version over the local firmware version or other such technique. In some cases, updating the local firmware version can include making a change to a portion of the local firmware version based on the up-to-date firmware version, such as to update only the portion(s) that may have changed between the local firmware version and the up-to-date firmware version.

Block 310 can be automatically performed for each of the set of components from block 306. For each of those components where a discrepancy was detected, block 312 can be performed.

After process 300 has completed or at least after blocks 310, 312 have been performed for the relevant components, the BMC can take additional actions as desired. For example, the BMC can initiate a notification, such as a digital notification (e.g., an email or other digital signal), an auditory notification (e.g., a beep or chime), a visual notification (e.g., flashing or turning on/off a light), or the like. In some cases where the storage device is a removable storage device, the BMC can automatically unmount and/or eject the removable storage device.

In some cases, process 300 can be performed on a large number of computing systems by passing a removable storage device between the systems sequentially. Thus, a user can automatically update all component firmware of a computing system by merely inserting a USB drive and walking away to perform other tasks until the update is complete, then moving on to update the next computing system.

While process 300 is described with certain blocks in a certain order, in some cases, instances of process 300 can include fewer blocks, additional blocks, different blocks, and/or a different order of blocks. For example, in some cases a new block for automatically unmounting a removable storage device can be added after block 312.

Figure 4:
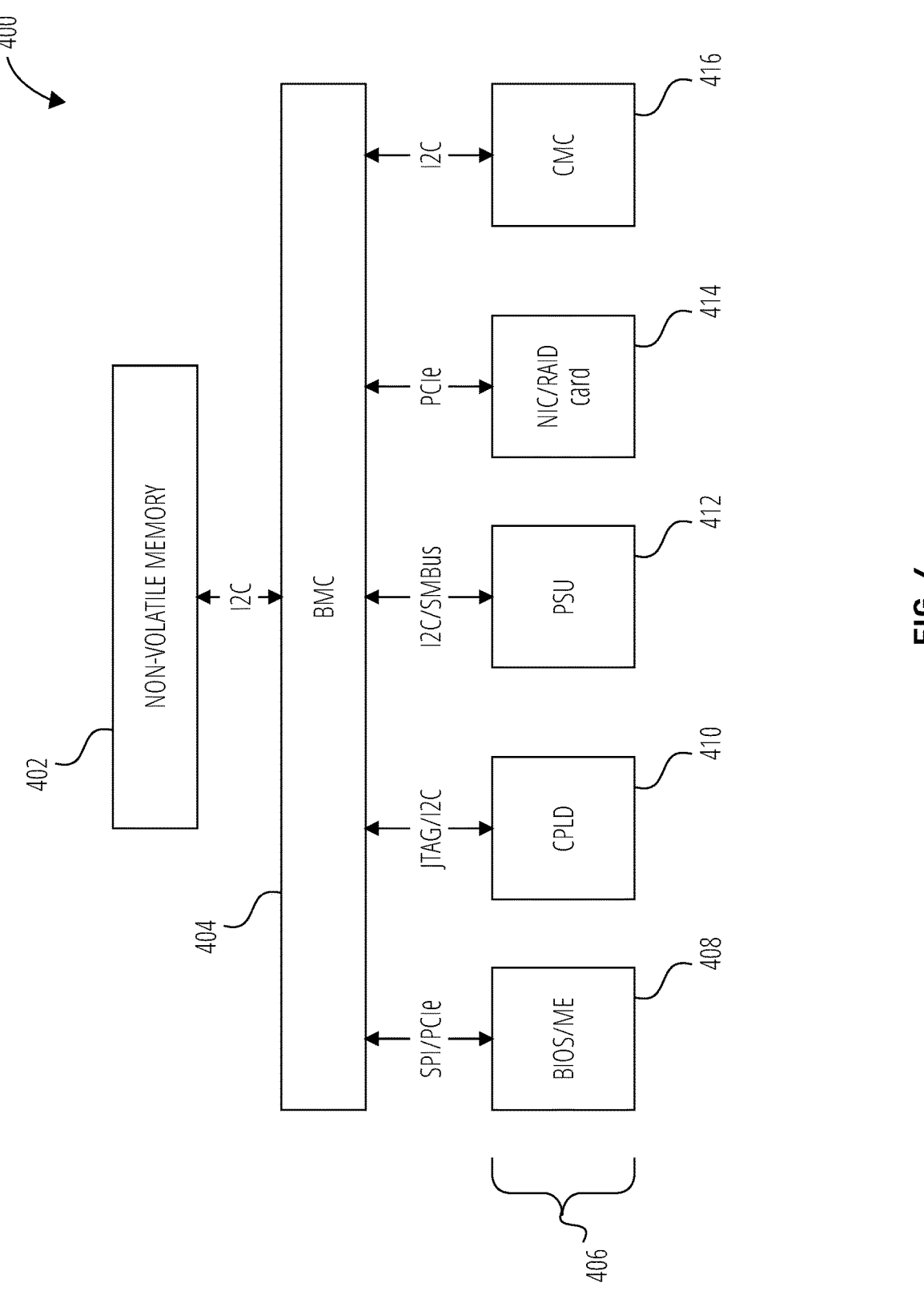
FIG. 4 is a block diagram depicting a computing system suitable for automated firmware updating, according to certain aspects of the present disclosure.

FIG. 4 is a block diagram depicting a computing system 400 suitable for automated firmware updating, according to certain aspects of the present disclosure. Computing system 400 can be computing system 102 or computing system 202 of FIG. 1 or 2, respectively.

The computing system 400 can include a BMC 404 that is communicatively coupled to non-volatile memory 402, such as via an I2C (inter-integrated circuit) bus. The BMC 404 can be coupled to a set of components 406. The BMC 404 can be coupled to a BIOS/ME 408 (BIOS or Management Engine), such as via a SPI/PCIe (serial peripheral interface or peripheral component interconnect express) bus. The BMC 404 can be coupled to a CPLD 410, such as via a JTAG/I2C (joint test action group or I2C) bus. The BMC 404 can be coupled to a PSU 412 (power supply unit), such as via a I2C/SMBus (I2C or system management bus) bus. The BMC 404 can be coupled to a NIC/RAID card 414 (network interface card or redundant array of independent disks card), such as via a PCIe bus. The BMC 404 can be coupled to a CMC 416 (chassis management controller), such as via an I2C bus.

The BMC 404 can communicate with each of the components 406 using their respective busses or interfaces. In this fashion, the BMC 404 can read information about the local firmware version stored on the component (e.g., stored in a memory of the component), as well as replace the local firmware version with an up-to-date firmware version (e.g., by writing to the memory of the component).

Figure 5:
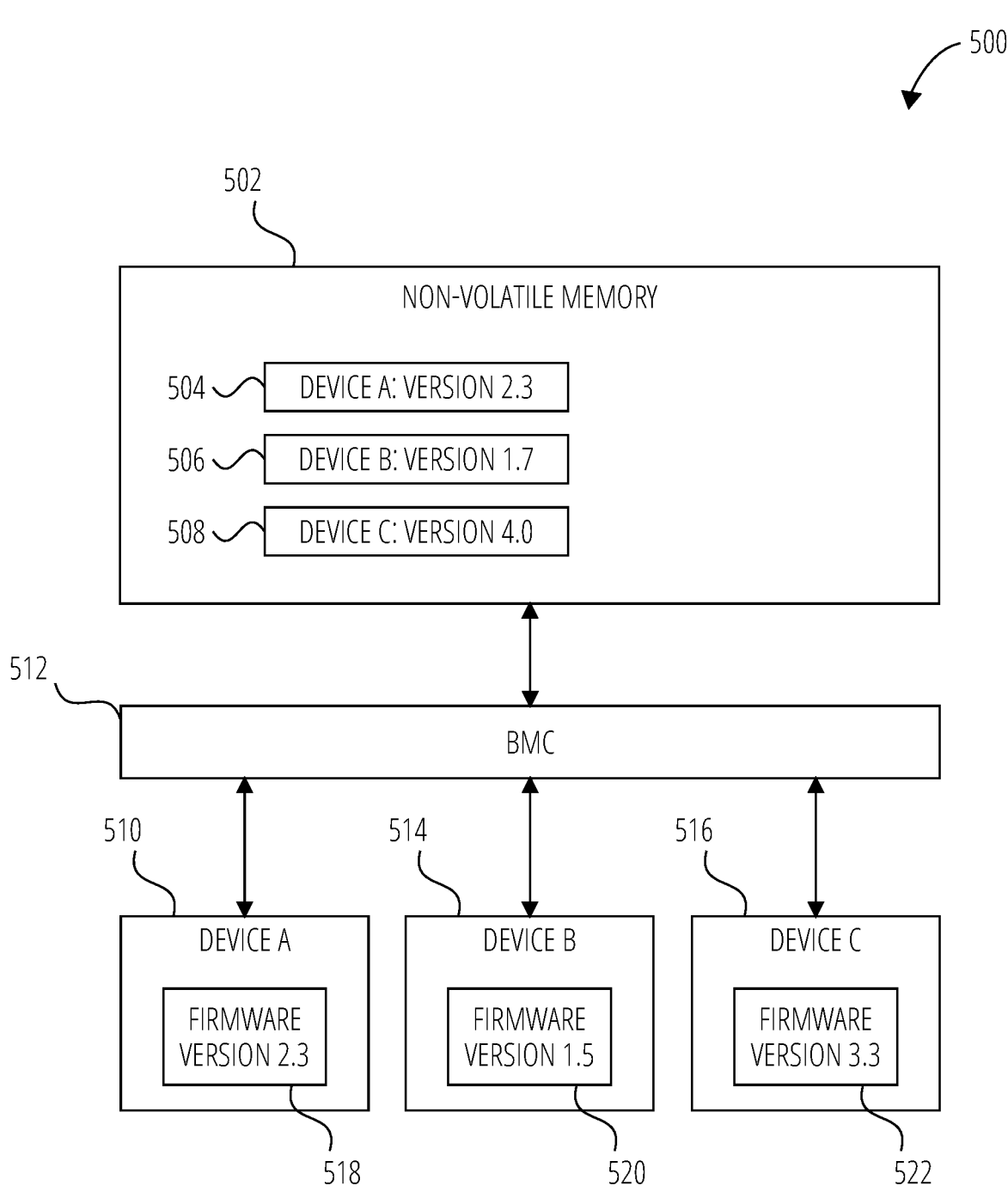
FIG. 5 is a block diagram depicting a computing system in the process of automated firmware updating, according to certain aspects of the present disclosure

FIG. 5 is a block diagram depicting a computing system 500 in the process of automated firmware updating, according to certain aspects of the present disclosure. The computing system 500 can be any suitable computing system, such as computing systems 102, 202, or 400 of FIG. 1, 2, or 4, respectively.

During the automated firmware update process, the BMC 512 can access device A 510, device B 514, and device C 516, such as via busses described with reference to FIG. 4. When accessing each of these devices, the BMC 512 can identify the firmware version used on each device. As seen in FIG. 5, the BMC 512 can ascertain that device A 510 has device A local firmware 518 with a version of "2.3"; device B 514 has a device B local firmware 520 with a version of "1.5"; and device C 516 has a device C local firmware 522 with a version of "3.3."

The BMC 512 can access non-volatile memory 502, which contains a firmware collection of up-to-date firmware versions. The BMC 512 can access this firmware collection to identify an up-to-date firmware version associated with each of device A 510, device B 514, and device C 516. The BMC 512 can then compare those up-to-date firmware versions with the local firmware versions stored on the devices to determine if a discrepancy exists.

For example, upon comparing device A up-to-date firmware 504 from the non-volatile memory 502 with device A local firmware 518 from device A 510, it is seen that both device A up-to-date firmware 504 and device A local firmware 518 have a version of "2.3." As a result, the BMC 512 can continue on without making changes to the device A local firmware 518.

In another example, upon comparing device B up-to-date firmware 506 from the non-volatile memory 502 with device B local firmware 520 from device B 514, it is seen that the device B up-to-date firmware 506 has a newer version of "1.7" than the "1.5" version of the device B local firmware 520. As a result, the BMC 512 can opt to update device B local firmware 520 based on the device B up-to-date firmware 506, such as by rewriting the device B local firmware 520 using the device B up-to-date firmware 506. Once completed, the device B 514 should have a device B local firmware 520 with a version of "1.7."

In some cases, the BMC 512 can also check to determine whether or not the up-to-date firmware version is actually compatible with the component and/or the computing system. For example, an up-to-date firmware version may no longer support certain aspects of a component that are supported by a current local firmware version.

In an example, device C 516 can include aspects that are supported by its device C local firmware 522 of version 3.3, but are not supported by any versions after 3.5. When the BMC 512 is comparing the device C up-to-date firmware 508 to the device C local firmware 522, the BMC 512 can perform a check to ensure that the device C up-to-date firmware 508 is compatible with the device C 516. The BMC 512 can determine that the device C up-to-date firmware 508 is not compatible (e.g., by obtaining compatibility information from device C up-to-date firmware 508, non-volatile memory 502, or another source), and thus will not update device C local firmware 522 using the device C up-to-date firmware 508. In some optional cases, non-volatile memory 502 can store alternate versions of device C up-to-date firmware 508, such as a 3.5 version. In such cases, the BMC 512 can identify the latest compatible up-to-date firmware version and use that to update the device C local firmware 522. In such a case, the device C local firmware 522 would be updated to version 3.5 since it is the latest compatible version, even though version 4.0 is present on the non-volatile memory 502.

Figure 6:
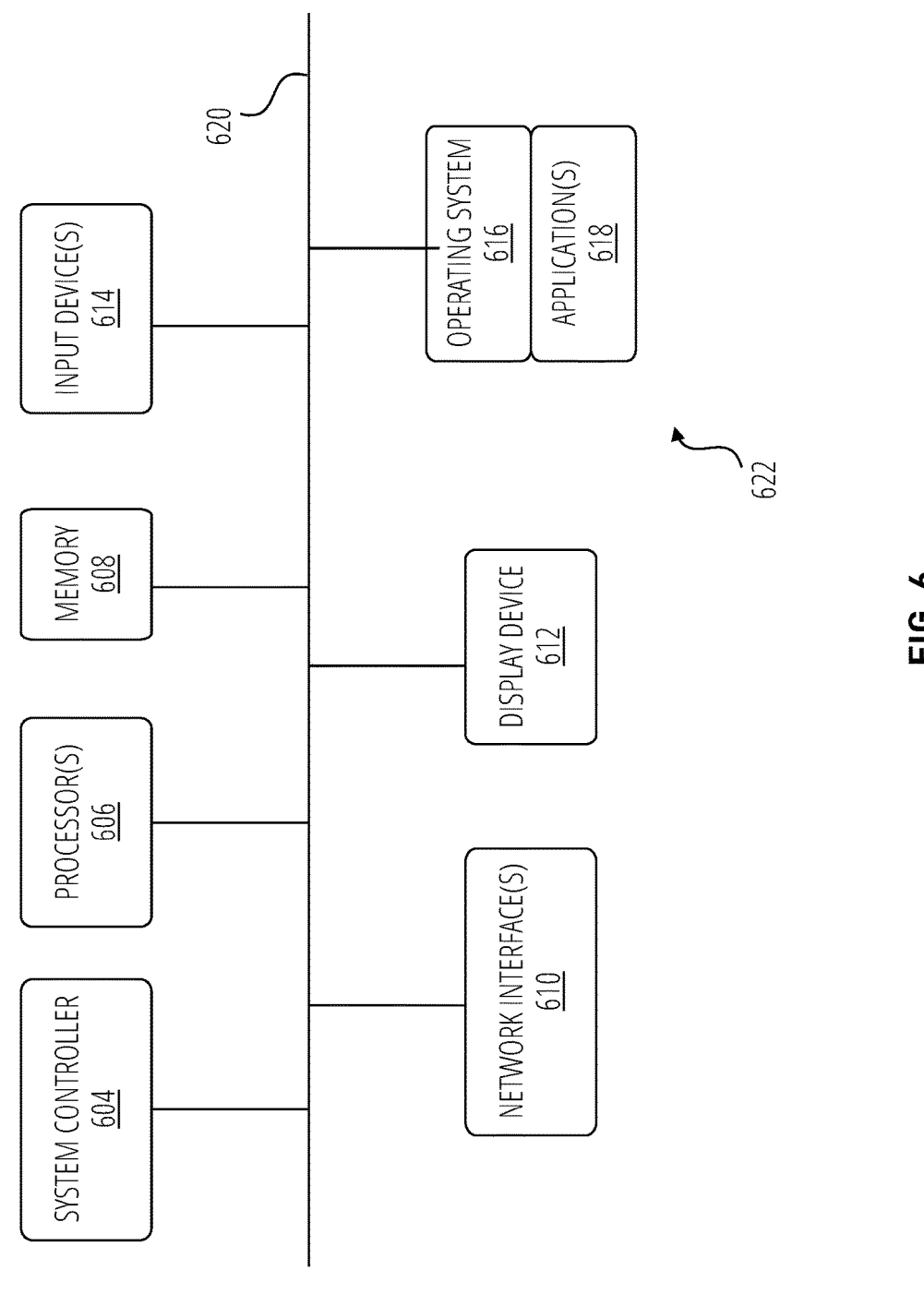
FIG. 6 is a block diagram of an example system architecture for implementing features and processes of the present disclosure.

FIG. 6 is a block diagram of an example system architecture 602 for implementing features and processes of the present disclosure, such as those presented with reference to process 300 of FIG. 3 or those presented with reference to FIG. 1, 2, 4, or 5. The features and processes disclosed herein can be implemented using one or multiple instances of system architecture 602. The system architecture 602 can be used to implement a server (e.g., a cloud-accessible server), a user device (e.g., a smartphone or personal computer), or any other suitable device for performing some or all of the aspects of the present disclosure. The system architecture 602 can be implemented on any electronic device that runs software applications derived from compiled instructions, including without limitation personal computers, servers, smart phones, electronic tablets, game consoles, email devices, and the like. In some implementations, the system architecture 602 can include one or more processors 606, one or more input devices 614, one or more display devices 612, one or more network interfaces 610, and one or more computer-readable media 622. Each of these components can be coupled by bus 620.

Display device 612 can be any known display technology, including but not limited to display devices using Liquid Crystal Display (LCD) or Light Emitting Diode (LED) technology. Processor(s) 606 can use any known processor technology, including but not limited to graphics processors and multi-core processors. Input device 614 can be any known input device technology, including but not limited to a keyboard (including a virtual keyboard), mouse, track ball, and touch-sensitive pad or display. In some cases, audio inputs can be used to provide audio signals, such as audio signals of an individual speaking. Bus 620 can be any known internal or external bus technology, including but not limited to ISA, EISA, PCI, PCI Express, NuBus, USB, Serial ATA or Fire Wire.

Computer-readable medium 622 can be any medium that participates in providing instructions to processor 606 for execution, including without limitation, non-volatile storage media (e.g., optical disks, magnetic disks, flash drives, etc.) or volatile media (e.g., SDRAM, ROM, etc.). The computer-readable medium (e.g., storage devices, mediums, and memories) can include, for example, a cable or wireless signal containing a bit stream and the like. However, when mentioned, non-transitory computer-readable storage media expressly exclude media such as energy, carrier signals, electromagnetic waves, and signals per se.

Computer-readable medium 622 can include various instructions for implementing operating system 616 and applications 618 such as computer programs. The operating system 616 can be multi-user, multiprocessing, multitasking, multithreading, real-time and the like. The operating system 616 performs basic tasks, including but not limited to: recognizing input from input device 614; sending output to display device 612; keeping track of files and directories on computer-readable medium 622; controlling peripheral devices (e.g., storage drives, interface devices, etc.) which can be controlled directly or through an I/O controller; and managing traffic on bus 620. Computer-readable medium 622 can include various instructions for implementing firmware processes, such as a BIOS. Computer-readable medium 622 can include various instructions for implementing any of the processes described herein, including at least process 300 of FIG. 3.

Memory 608 can include high-speed random access memory and/or non-volatile memory, such as one or more magnetic disk storage devices, one or more optical storage devices, and/or flash memory (e.g., NAND, NOR). The memory 608 (e.g., computer-readable storage devices, mediums, and memories) can include a cable or wireless signal containing a bit stream and the like. However, when mentioned, non-transitory computer-readable storage media expressly exclude media such as energy, carrier signals, electromagnetic waves, and signals per se. The memory 608 can store an operating system, such as Darwin, RTXC, LINUX, UNIX, OS X, WINDOWS, or an embedded operating system such as VxWorks.

System controller 604 can be a service processor that operates independently of processor 606. In some implementations, system controller 604 can be a baseboard management controller (BMC). For example, a BMC is a specialized service processor that monitors the physical state of a computer, network server, or other hardware device using sensors and communicating with the system administrator through an independent connection. The BMC is configured on the motherboard or main circuit board of the device to be monitored. The sensors of a BMC can measure internal physical variables such as temperature, humidity, power-supply voltage, fan speeds, communications parameters and operating system (OS) functions.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computing system that includes a back-end component, such as a data server, or that includes a middleware component, such as an application server or an Internet server, or that includes a front-end component, such as a client computer having a graphical user interface or an Internet browser, or any combination thereof. The components of the system can be connected by any form or medium of digital data communication such as a communication network. Examples of communication networks include, e.g., a LAN, a WAN, and the computers and networks forming the Internet.

The computing system can include clients and servers. A client and server are generally remote from each other and typically interact through a network. The relationship of client and server arises by virtue of computer programs running on the respective computers and having a client-server relationship to each other.

One or more features or steps of the disclosed embodiments can be implemented using an application programming interface (API). An API can define one or more parameters that are passed between a calling application and other software code (e.g., an operating system, library routine, function) that provides a service, that provides data, or that performs an operation or a computation.

The API can be implemented as one or more calls in program code that send or receive one or more parameters through a parameter list or other structure based on a call convention defined in an API specification document. A parameter can be a constant, a key, a data structure, an object, an object class, a variable, a data type, a pointer, an array, a list, or another call. API calls and parameters can be implemented in any programming language. The programming language can define the vocabulary and calling convention that a programmer will employ to access functions supporting the API.

In some implementations, an API call can report to an application the capabilities of a device running the application, such as input capability, output capability, processing capability, power capability, communications capability, and the like.

The foregoing description of the embodiments, including illustrated embodiments, has been presented only for the purpose of illustration and description and is not intended to be exhaustive or limiting to the precise forms disclosed. Numerous modifications, adaptations, and uses thereof will be apparent to those skilled in the art. Numerous changes to the disclosed embodiments can be made in accordance with the disclosure herein, without departing from the spirit or scope of the disclosure. Thus, the breadth and scope of the present disclosure should not be limited by any of the above described embodiments.

Although certain aspects and features of the present disclosure have been illustrated and described with respect to one or more implementations, equivalent alterations and modifications will occur or be known to others skilled in the art upon the reading and understanding of this specification and the annexed drawings. In addition, while a particular feature may have been disclosed with respect to only one of several implementations, such feature may be combined with one or more other features of the other implementations as may be desired and advantageous for any given or particular application.

The terminology used herein is for the purpose of describing particular embodiments only, and is not intended to be limiting of the disclosure. As used herein, the singular forms "a," "an," and "the" are intended to include the plural forms as well, unless the context clearly indicates otherwise. Furthermore, to the extent that the terms "including," "includes," "having," "has," "with," or variants thereof, are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art. Furthermore, terms, such as those defined in commonly used dictionaries, should be interpreted as having a meaning that is consistent with their meaning in the context of the relevant art, and will not be interpreted in an idealized or overly formal sense unless expressly so defined herein.

One or more elements or aspects or steps, or any portion(s) thereof, from one or more of any of the claims below can be combined with one or more elements or aspects or steps, or any portion(s) thereof, from one or more of any of the other claims below or combinations thereof, to form one or more additional implementations and/or claims of the present disclosure.

What is claimed is:

1. A method for updating firmware associated with a computing system, the method comprising:

receiving, by a baseboard management controller (BMC) of the computing system, an indication to commence a firmware update process;

identifying, by the BMC, a set of components, the set of components including one or more components of the computing system;

accessing, by the BMC, for each component of the set of components, a local firmware version associated with the respective component, the local firmware version being usable to operate the respective component for use in the computing system;

accessing, by the BMC, a firmware collection from a storage device coupled to the BMC, the firmware collection including at least one up-to-date firmware version for a plurality of components;

comparing, by the BMC, for each component of the set of components, the local firmware version with the at least one up-to-date firmware version;

detecting, by the BMC, for one or more components of the set of components, a firmware version discrepancy based on the comparing of a respective local firmware version with a respective up-to-date firmware version; and updating, by the BMC, in response to detecting the firmware version discrepancy, the respective local firmware version with the respective up-to-date firmware version;

wherein receiving the indication to commence the firmware update process, identifying the set of components, accessing the local firmware version, accessing the firmware collection, comparing the local firmware version with the at least one up-to-date firmware version, detecting the firmware version discrepancy, and updating the local firmware version all occur prior to a processor of the computing system loading an operating system.

2. The method of claim 1, wherein the set of components includes at least a first component from a first manufacturer and a second component from a second manufacturer.

3. The method of claim 1, wherein the storage device is a removable storage device communicatively coupled to the BMC.

4. The method of claim 3, wherein receiving the indication to commence the firmware update includes detecting insertion of the removable storage device.

5. The method of claim 1, wherein receiving the indication to commence the firmware update includes receiving a signal from a remote system.

6. The method of claim 1, further comprising:

accessing one or more vendor firmware servers associated with the plurality of components; and storing the up-to-date firmware versions for the plurality of components on the storage device.

7. The method of claim 6, wherein accessing the one or more vendor firmware servers and storing the up-to-date firmware versions are performed by a facilitator system that is distinct from the BMC and the computer system, and wherein the method further comprises communicatively coupling the storage device to the BMC.

8. The method of claim 6, wherein accessing the one or more vendor firmware servers includes accessing the one or more vendor firmware servers using a network interface communicatively coupled to the computing system, and wherein accessing the one or more vendor firmware servers occurs in an operating system environment after a processor of the computing system has loaded an operating system.

9. The method of claim 6, wherein accessing the one or more vendor firmware servers includes accessing the one or more vendor firmware servers using a network interface communicatively coupled to the BMC, and wherein accessing the one or more vendor firmware servers occurs outside of an operating system environment prior to a processor of the computing system loading an operating system.

10. The method of claim 6, wherein accessing the one or more vendor firmware servers is based at least in part on the identified set of components.

11. The method of claim 1, wherein detecting the firmware version discrepancy includes detecting that the up-to-date firmware version (i) has a higher version number than the local firmware version; (ii) is more recent than the local firmware version; or (iii) both (i) and (ii).

12. A computing system, comprising:

a processor coupled to processor-accessible memory containing instructions thereon to load an operating system;

a set of components, each of the set of components having an associated local firmware version that is usable to operate the respective component for use in the computing system;

a baseboard management controller (BMC);

a storage device communicatively couplable to the BMC; and a non-transitory storage medium communicatively coupled to the BMC and containing instructions which, when executed by the BMC, cause the BMC to perform operations including:

receiving an indication to commence a firmware update process;

identifying the set of components;

accessing, for each of the set of components, the local firmware version associated with the respective component;

accessing a firmware collection from the storage device, the firmware collection including, for a plurality of components, at least one up-to-date firmware version;

comparing, for each of the set of components, the local firmware version with the at least one up-to-date firmware version of the firmware collection;

detecting, for one or more of the set of components, a firmware version discrepancy based on the comparison of the respective local firmware version with the respective up-to-date firmware version; and updating, in response to detecting the firmware version discrepancy, the respective local firmware version with the respective up-to-date firmware version from the storage device;

wherein receiving the indication to commence the firmware update process, identifying the set of components, accessing the local firmware version, accessing the firmware collection, comparing the local firmware version with the at least one up-to-date firmware version, detecting the firmware version discrepancy, and updating the respective local firmware version all occur prior to the processor loading the operating system.

13. The computing system of claim 12, wherein the set of components includes at least a first component from a first manufacturer and a second component from a second manufacturer, and wherein detecting the firmware version discrepancy includes detecting that the up-to-date firmware version (i) has a higher version number than the local firmware version; (ii) is more recent than the local firmware version; or (iii) both (i) and (ii).

14. The computing system of claim 12, wherein the storage device is a removable storage device communicatively coupled to the BMC, and wherein receiving the indication to commence the firmware update includes detecting insertion of the removable storage device.

15. A computing environment comprising:

a removable storage device;

a facilitator system communicatively couplable to at least one vendor firmware server to access up-to-date firmware versions for a plurality of components from the at least one vendor firmware server, the facilitator system including:

a facilitator processor;

a facilitator non-transitory storage medium communicatively coupled to the facilitator processor and containing instructions which, when executed by the facilitator processor, cause the facilitator processor to perform facilitator operations including;

accessing the one or more vendor firmware servers; and storing the up-to-date firmware versions for the plurality of components on the removable storage device as a firmware collection; and a computer system distinct from the facilitator system, the computer system including:

a processor coupled to processor-accessible memory containing instructions thereon to load an operating system;

a set of components, each of the set of components having an associated local firmware version that is usable to operate the respective component for use in the computer system;

a baseboard management controller (BMC); and a non-transitory storage medium communicatively coupled to the BMC and containing instructions which, when executed by the BMC, cause the BMC to perform operations including:

receiving an indication to commence a firmware update process;

identifying the set of components;

accessing, for each of the set of components, the local firmware version associated with the respective component;

accessing the firmware collection from the removable storage device, the firmware collection including at least one up-to-date firmware version associated with each of the set of components;

comparing, for each of the set of components, the local firmware version with the at least one up-to-date firmware version of the firmware collection;

detecting, for one or more of the set of components, a firmware version discrepancy based on the comparison of the respective local firmware version with the respective up-to-date firmware version; and updating, in response to detecting the firmware version discrepancy, the respective local firmware version with the respective up-to-date firmware version from the removable storage device;

wherein receiving the indication to commence the firmware update process, identifying the set of components, accessing the local firmware version, accessing the firmware collection, comparing the local firmware version with the at least one up-to-date firmware version, detecting the firmware version discrepancy, and updating the respective local firmware version all occur prior to the processor loading the operating system.

16. The computing environment of claim 15, wherein the set of components includes at least a first component from a first manufacturer and a second component from a second manufacturer, and wherein detecting the firmware version discrepancy includes detecting that the up-to-date firmware version (i) has a higher version number than the local firmware version; (ii) is more recent than the local firmware version; or (iii) both (i) and (ii).

17. The computing environment of claim 15, wherein receiving the indication to commence the firmware update includes detecting insertion of the removable storage device.

* * * * *